US011875758B1

(12) United States Patent
Zhang et al.

(10) Patent No.: US 11,875,758 B1
(45) Date of Patent: Jan. 16, 2024

(54) PIXEL DRIVE CIRCUIT AND DISPLAY PANEL

(71) Applicant: HKC CORPORATION LIMITED, Shenzhen (CN)

(72) Inventors: Guangchen Zhang, Shenzhen (CN); Yunyang Liu, Shenzhen (CN); Tingting Shen, Shenzhen (CN); Li Lv, Shenzhen (CN); Yuchun Xu, Shenzhen (CN); Zhiwei Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/068,731

(22) Filed: Dec. 20, 2022

(30) Foreign Application Priority Data

Aug. 26, 2022 (CN) ........................ 202211030647.X

(51) Int. Cl.
*G09G 3/36* (2006.01)

(52) U.S. Cl.
CPC ... *G09G 3/3648* (2013.01); *G09G 2300/0842* (2013.01); *G09G 2320/0214* (2013.01)

(58) Field of Classification Search
CPC ......... G09G 3/3648; G09G 2300/0842; G09G 2320/0214; G09G 3/36
See application file for complete search history.

(56) References Cited

U.S. PATENT DOCUMENTS

| | | | | |
|---|---|---|---|---|
| 5,627,557 A * | 5/1997 | Yamaguchi .......... | G09G 3/3659 345/96 |
| 7,760,179 B2 * | 7/2010 | Lee ...................... | G09G 3/3688 345/98 |
| 2005/0219196 A1 * | 10/2005 | Lee ...................... | G09G 3/3614 345/100 |
| 2010/0026921 A1 * | 2/2010 | Tsubata ................ | G09G 3/3648 349/39 |

FOREIGN PATENT DOCUMENTS

| | | |
|---|---|---|
| CN | 101241281 A | 8/2008 |
| CN | 105096888 A | 11/2015 |
| CN | 106157903 A | 11/2016 |
| CN | 107463035 A | 12/2017 |
| CN | 110244481 A | 9/2019 |
| CN | 111403418 A | 7/2020 |
| CN | 113707107 A | 11/2021 |

* cited by examiner

*Primary Examiner* — Matthew A Eason
*Assistant Examiner* — Sujit Shah
(74) *Attorney, Agent, or Firm* — Maier & Maier, PLLC

(57) ABSTRACT

A pixel drive circuit, which includes: a first thin film transistor, a first unidirectional conduction switch, a second thin film transistor, a second unidirectional conduction switch, and a pixel capacitor; and the first thin film transistor includes: a first gate electrode, a first source electrode, and a first drain electrode; the first gate electrode being connected with a n-th scan line, the first source electrode being connected with a m-th scan line, and the first drain electrode being connected with the pixel capacitor, and the n and m are positive integers; the second thin film transistor includes: a second gate electrode, a second source electrode, and a (Continued)

100 second drain electrode; the second gate electrode being connected with a (n−1)-th scan line, the second source electrode being connected with the pixel capacitor, and the second drain electrode being grounded.

18 Claims, 4 Drawing Sheets

PIXEL DRIVE CIRCUIT AND DISPLAY PANEL

CROSS REFERENCE TO RELATED APPLICATION

Pursuant to 35 U.S.C. § 119 and the Paris Convention Treaty, this application claims the benefit of Chinese Patent Application No. 202211030647.X filed Aug. 26, 2022, the contents of which are incorporated herein by reference.

TECHNICAL FIELD

The present application relates to the technical field of plane display, and more particularly to a pixel drive circuit and a display panel.

BACKGROUND

With the rapid development of Thin Film Transistor liquid crystal display (TFT-LCD), the requirements of high resolution, wide viewing angle, high response speed and high opening rate of products put forward higher requirements for display quality of devices. With the improvement of resolution, the pixel size becomes smaller, the wiring becomes more and more fine, and the line width and line spacing become smaller and smaller. When there is current passing through the lines, the interference between lines becomes particularly prominent, which leads to increased coupling between the pixels and the electrode lines. These will lead to the occurrence of crosstalk, which greatly affects the yield and seriously affects the product benefit. Therefore, crosstalk is a major problem to be solved for TFT-LCD devices.

In TFT-LCD, crosstalk is defined as a phenomenon that the display of one area of the whole screen will be affected by another area, resulting in a picture distortion. Crosstalk is mainly divided into a horizontal crosstalk and a vertical crosstalk. For the horizontal crosstalk, the main reason is the delay of the common electrode, which mainly includes the resistance of the common electrode itself and the excessive coupling capacitance between the data lines and the common electrode. These two reasons will cause the display screen to deviate from the set gray scale, thus causing poor display of the screen; For the vertical crosstalk, the main reasons can be attributed to two points, including the influence of coupling capacitance and leakage current in TFT. Coupling capacitance refers to the coupling capacitance between the data line and the pixel electrode. When the voltage of the data line changes, which will affect the pixel electrode through the coupling capacitance, the potential of the pixel electrode is deviated from the set value, which results in changing in the display gray scale. The influence of leakage current in TFT means that after the scan lines are closed, the TFT is stimulated by external energy (data lines and light) and leak to its own data lines, and resulting in poor display.

SUMMARY

In order to solve the technical problems, the present application provides a pixel drive circuit and a display panel, so as to improve problem of the vertical crosstalk caused by leakage current in TFT.

A first aspect of the present application provides a pixel drive circuit, which includes: a first thin film transistor, a first unidirectional conduction switch connected in series with the first thin film transistor, a second thin film transistor, a second unidirectional conduction switch connected in series with the second thin film transistor, and a pixel capacitor arranged between the first unidirectional conduction switch and the second unidirectional conduction switch; and the first thin film transistor includes: a first gate electrode, a first source electrode, and a first drain electrode; the first gate electrode being connected with a n-th scan line, the first source electrode being connected with a m-th scan line, and the first drain electrode being connected with the pixel capacitor, and the n and m are positive integers;

the second thin film transistor includes: a second gate electrode, a second source electrode, and a second drain electrode; the second gate electrode being connected with a (n−1)-th scan line, the second source electrode being connected with the pixel capacitor, and the second drain electrode being grounded.

In an embodiment, the first unidirectional conduction switch includes a P-type amorphous silicon layer and an N-type amorphous silicon layer arranged in overlapping.

In an embodiment, the first unidirectional conduction switch is arranged above the first gate electrode, and the first unidirectional conduction switch is electrically connected with the first drain electrode.

In an embodiment, the first drain electrode comprises: a first drain part and a second drain part arranged at intervals, the first drain part is overlapped with an active layer of the first thin film transistor, and the second drain part is connected with the pixel capacitor; the P-type amorphous silicon layer is partially overlapped with the first drain part, an end of the N-type amorphous silicon layer is overlapped on the P-type amorphous silicon layer, and the other end of the N-type amorphous silicon layer is partially overlapped with the second drain part.

In an embodiment, an N-type heavily doped layer is arranged between the first unidirectional conduction switch and the first drain electrode.

In an embodiment, the pixel capacitor includes a pixel electrode and a first common electrode; the pixel drive circuit further comprises a storage capacitor arranged between the first unidirectional conduction switch and the second unidirectional conduction switch, and the storage capacitor comprises the pixel electrode and a second common electrode.

In an embodiment, when the n-th scan line receives a high potential signal, the first thin film transistor is turned on and the first unidirectional conduction switch is in a turn-on state, and a voltage is written into the pixel capacitor; when the n-th scan line receives a low potential signal, the first thin film transistor is turned off and the first unidirectional conduction switch is in a turn-off state.

In an embodiment, the pixel drive circuit is configured to drive one pixel to successively pass through a first voltage maintaining stage, a grounded discharge stage, a writing stage and a second voltage maintaining stage within a frame time; when the pixel drive circuit is in the first voltage maintaining stage, the pixel capacitor maintains a voltage written in a previous frame; when the pixel drive circuit is in the grounded discharge stage, the pixel capacitor discharges; when the pixel drive circuit is in the writing stage, a voltage is written into the pixel capacitor; and when the pixel drive circuit is in the second voltage maintaining stage, the pixel capacitor maintains the voltage written in a current frame.

In an embodiment, when the (n−1)-th scan line receives a high potential signal, the pixel drive circuit is in the grounded discharge stage, the second thin film transistor is in a conducting state, and the first thin film transistor is in a turn-off state.

A second aspect of the present application provides a display panel, comprising: a plurality of scan lines which are mutually parallel and a plurality of data lines which are mutually parallel and arranged orthogonal to the scan lines; the plurality of scan lines and the plurality of data lines are vertically insulated and intersected to define a plurality of pixels; each of the plurality of pixels is correspondingly provided with a pixel drive circuit as described in the first aspect.

The pixel drive circuit provided by the present application includes the first thin film transistor, the first unidirectional conduction switch, the second thin film transistor, the second unidirectional conduction switch and a pixel capacitor. The first unidirectional conduction switch and the second unidirectional conduction switch have unidirectional conductivity, which can not only ensure the normal turning on of TFT, but also reduce the leakage current when TFT is turned off. Thus, the pixel drive circuit can reduce the TFT leakage problem caused by external energy excitation, thereby effectively improving the poor display problems such as screen crosstalk. At the same time, the pixel drive circuit further controls the change of the pixel potential of a next row through the change of the signal of the last row of scan line, so as to effectively control the normal display of the screen. The pixel drive circuit has a simple structure and effectively improves the vertical crosstalk problem caused by the leakage current in TFT.

The display panel provided by the present application includes the pixel drive circuit, which further improves the vertical crosstalk problem caused by the leakage current in TFT, and ensure a better display effect.

BRIEF DESCRIPTION OF THE DRAWINGS

In order to more clearly describe the technical solution in the embodiments of the present application, the following will briefly introduce the drawings needed to be used in the description of the embodiments. Obviously, the drawings in the following description are only some embodiments of the present application. For ordinary technicians in the art, other drawings can be obtained from these drawings without paying creative labor.

DETAILED DESCRIPTION OF THE EMBODIMENTS

Figure 1:
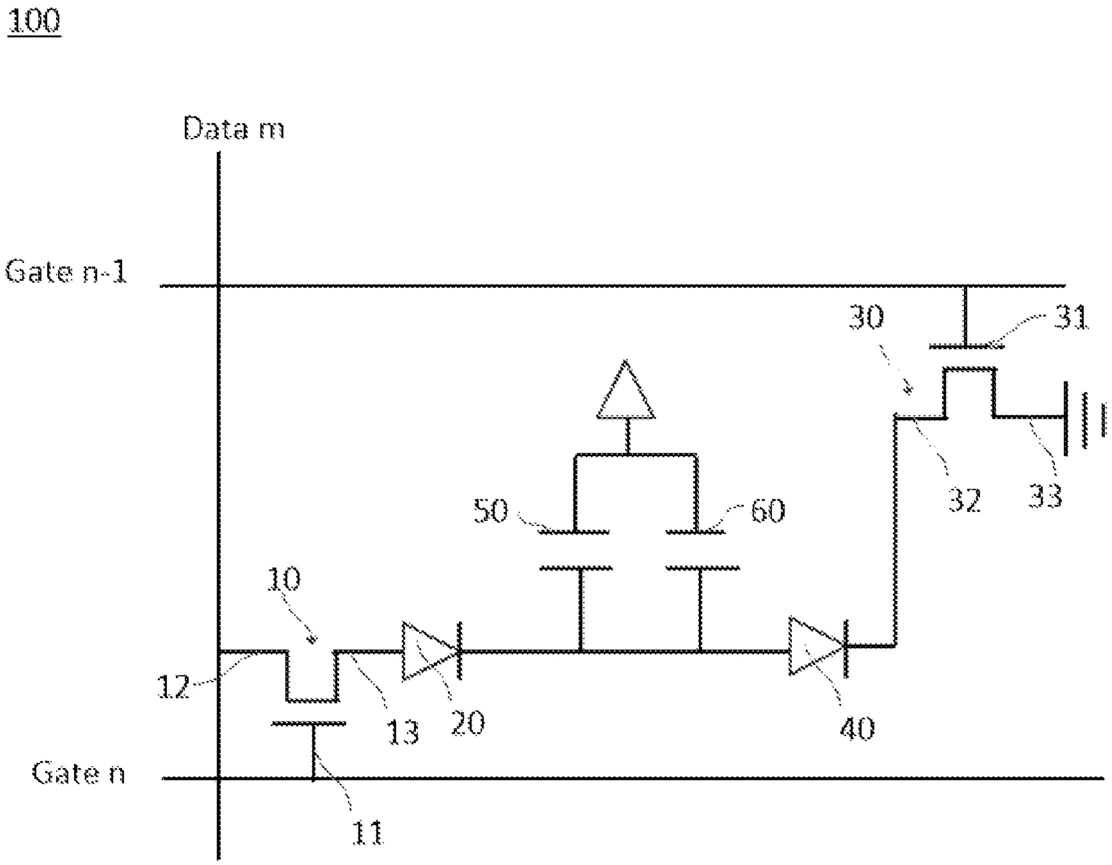
FIG. 1 is a schematic diagram of an equivalent circuit of a pixel drive circuit provided by an embodiment of the present application.

In order to make the purpose, technical solution and advantages of the present application more clear, the present application is further described in detail below in combination with the accompanying drawings (i.e. embodiments). It should be understood that the specific embodiments described herein are only used to explain the present application, not to limit the present application.

It should be noted that when a component is called "fixed to" or "arranged to" another component, it can be directly or indirectly on the other component. When a component is said to be "connected" to another component, it can be directly or indirectly connected to the other component. The terms "first" and "second" are only used for descriptive purposes and cannot be understood as indicating or implying relative importance or implicitly indicating the number of technical features. "plurality" means two or more, unless otherwise specified.

It should also be noted that in the embodiment of the present application, the same reference numeral represents the same component or the same part. For the same component in the embodiment of the present application, only one part or component may be used as an example to mark the reference sign. It should be understood that the reference signs are also applicable to other identical parts or components.

In order to explain the technical solution of the present application, the following will be described in combination with specific drawings and embodiments.

The embodiments of the first aspect of the application provide a pixel drive circuit, which is arranged in a display panel to drive a corresponding pixel. In an embodiment, the display panel includes an array substrate, an opposite substrate arranged opposite to the array substrate, and a liquid crystal layer arranged between the array substrate and the opposite substrate. The pixel drive circuit is arranged on the array substrate.

As shown in FIG. 1, the pixel drive circuit 100 includes a first thin film transistor (TFT) 10, a first unidirectional conduction switch 20, a second thin film transistor 30, a second unidirectional conduction switch 40, and a pixel capacitor 50.

The first thin film transistor 10 includes a first gate electrode 11, a first source electrode 12, and a first drain electrode 13. The first gate electrode 11 is connected to the n-th scan line, the first source electrode 12 is connected to the n-th data line, and the first drain electrode 13 is electrically connected to the pixel capacitor 50. Both n and m are positive integers. The first thin film transistor 10 is a control switch of the pixel drive circuit 100.

The first unidirectional conduction switch 20 has the characteristics of unidirectional conduction, and the first unidirectional conduction switch 20 is connected in series with the first thin film transistor 10.

The second thin film transistor 30 includes a second gate electrode 31, a second source electrode 32 and a second drain electrode 33. The second gate electrode 31 is connected to the (n−1)-th scan line, the second source electrode 32 is connected to the pixel capacitor 50, and the second drain electrode 33 is grounded. The (n−1)-th scan line is the previous scan line of the n-th scan line. When a frame image is driven, the (n−1)-th scan line is first turned on, when the n-th scan line is turned on.

The second unidirectional conduction switch 40 further has the characteristics of unidirectional conduction, and the second unidirectional conduction switch 40 is connected in series with the second thin film transistor 30.

The pixel capacitor 50 is connected to the first drain electrode 13, and the pixel capacitor (Clc) is arranged between the first unidirectional conduction switch 20 and the second unidirectional conduction switch 40.

Figure 2:
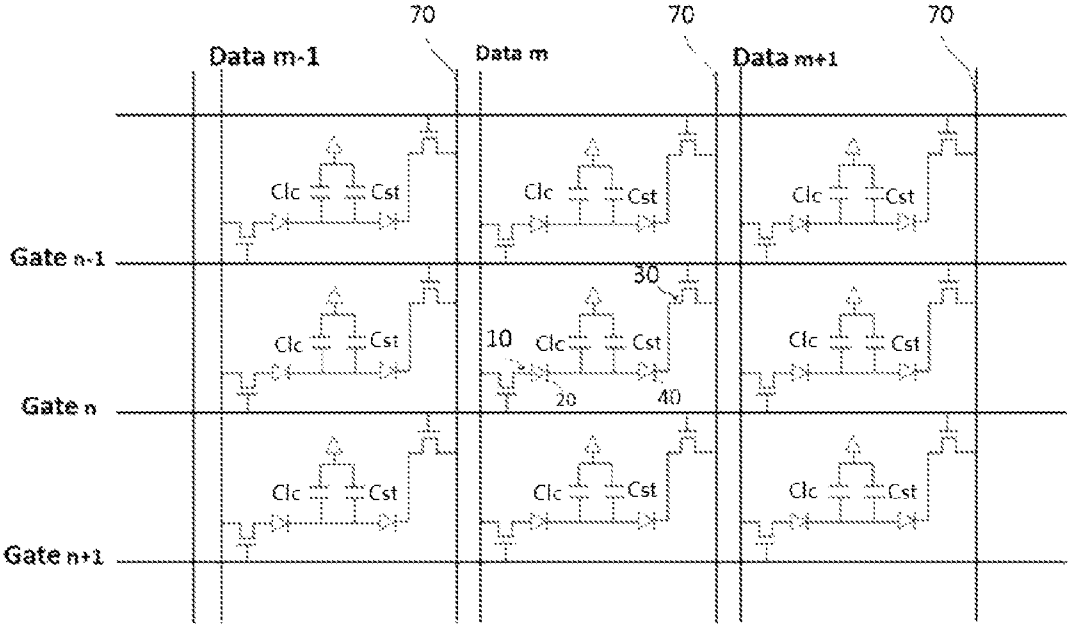
FIG. 2 is a schematic diagram of an equivalent circuit of a multi-level pixel drive circuit provided by an embodiment of the present application.
Figure 3:
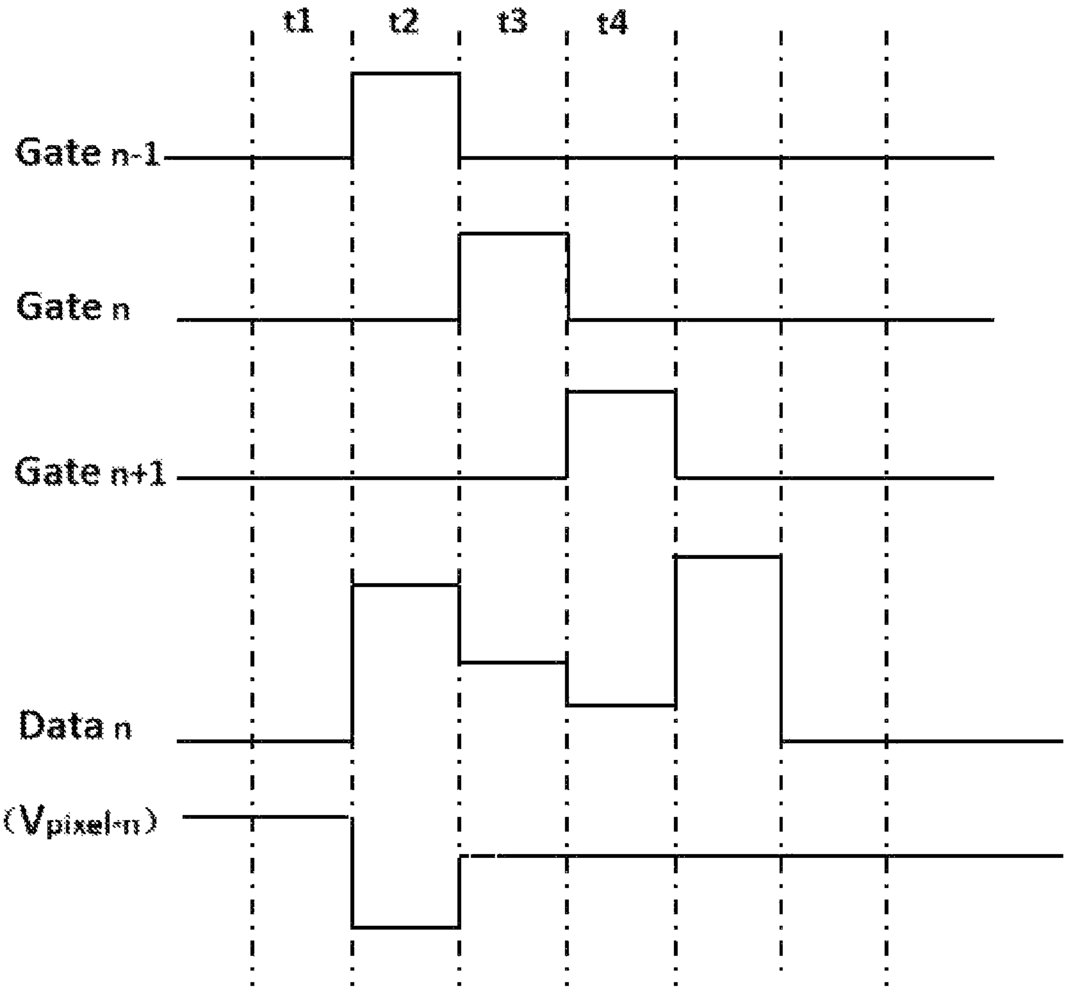
FIG. 3 is a timing chart of a multi-level pixel drive circuit provided by an embodiment of the present application.
Figure 4:
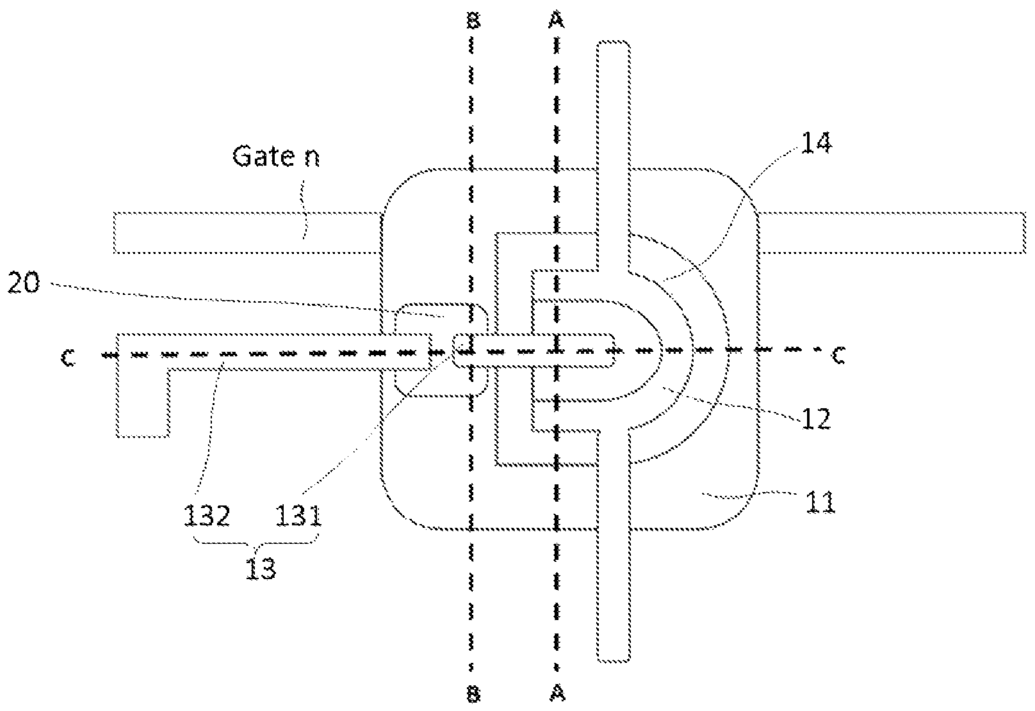
FIG. 4 is a partial schematic diagram of a pixel drive circuit provided by an embodiment of the present application.

As shown in FIGS. 1 to 3, the working principle of the above pixel drive circuit 100 is as follows:

When the (n−1)-th scan line receives the high potential signal, the second thin film transistor 30 turns on, so that the pixel capacitor 50 is grounded and discharged to prepare for charging.

When the n-th scan line receives the high potential signal, the potential of the n-th scan line is higher than the potential of the pixel capacitor 50, the first unidirectional conduction switch 20 is in a turn-on state, the first thin film transistor 10 is normally turned on, the second thin film transistor 30 is turned off, and the pixel capacitor 50 writes the voltage normally. The high level of the scan line is further fed back to the second thin film transistor 30 of the next line ((n+1)-th line).

When the n-th scan line starts to be a low level, the first thin film transistor 10 is turned off, the potential of the pixel capacitor 50 is at the high end, and the first unidirectional conduction switch 20 is in the turn-off state, so that the first unidirectional conduction switch 20 is able to effectively cut off the leakage current, to achieve the effect of improving or eliminating vertical crosstalk, and the pixel capacitor can maintain the voltage required for image display; at this time, the low level of the scan line is further fed back to the second thin film transistor 30 in the next line. This cycle completes the normal display of the entire screen.

The pixel drive circuit 100 provided by the present application includes the first thin film transistor 10, the first unidirectional conduction switch 20, the second thin film transistor 30, the second unidirectional conduction switch 40 and a pixel capacitor 50. The first unidirectional conduction switch 20 and the second unidirectional conduction switch 20 have unidirectional conductivity, which can not only ensure the normal turning on of TFT, but also reduce the leakage current when TFT is turned off. Thus, the pixel drive circuit 100 can reduce the TFT leakage problem caused by external energy excitation, thereby effectively improving the poor display problems such as screen crosstalk. At the same time, the pixel drive circuit 100 further controls the change of the pixel potential of a next row through the change of the signal of the last row of scan line, so as to effectively control the normal display of the screen. The pixel drive circuit 100 has a simple structure and effectively improves the vertical crosstalk problem caused by the leakage current in TFT.

As shown in FIG. 1, the pixel capacitor 50 includes a pixel electrode and a first common electrode, the first common electrode is arranged on the opposite substrate; the pixel drive circuit 100 further includes a storage capacitor (Cst) 60, and the storage capacitor 60 is arranged between the first unidirectional conduction switch 20 and the second unidirectional conduction switch 40. The storage capacitor 60 includes a pixel electrode and a second common electrode, the second common electrode is a common electrode line. The pixel capacitor 50 is configured to generate electric field to drive the deflection of liquid crystal, and the storage capacitor 60 is configured to ensure the stability of the voltage of the pixel capacitor 50 within a frame time.

As shown in FIGS. 4 to 7. In one embodiment, the first unidirectional conduction switch 20 and the second unidirectional conduction switch 40 both include PN junction. In an embodiment, the first unidirectional conduction switch 20 includes a P-type amorphous silicon layer 21 and an N-type amorphous silicon layer 22 arranged in overlapping. In this way, the P-type amorphous silicon layer 21 is in close contact with the N-type amorphous silicon layer 22, and an interface is formed between the P-type amorphous silicon layer 21 and the N-type amorphous silicon layer 22. The space charge area formed by the interface is the PN junction, so that the first unidirectional conduction switch 20 has the unidirectional conduction performance. The second unidirectional conduction switch 40 is the same as the first unidirectional conduction switch 20, which further includes the P-type amorphous silicon layer 21 and the N-type amorphous silicon layer 22 arranged in overlapping. The P-type amorphous silicon layer 21 is in close contact with the N-type amorphous silicon layer 22, and an interface is formed between the P-type amorphous silicon layer 21 and the N-type amorphous silicon layer 22. The space charge area formed by the interface is the PN junction, which is omitted here.

In an embodiment, the first unidirectional conduction switch 20 is electrically connected with the first drain electrode 13, and the first unidirectional conduction switch 20 is arranged above the first gate electrode 11. The first unidirectional conduction switch 20 is insulated from the first grid electrode 11.

In the embodiment, the first unidirectional conduction switch 20 is electrically connected with the first drain electrode 13 to realize the series connection of the first unidirectional conduction switch 20 and the first thin film transistor 10; Furthermore, the first unidirectional conduction switch 20 is arranged at one end of the first thin film transistor 10 close to the pixel capacitor 50.

The second unidirectional conduction switch 40 is arranged above the second gate electrode 31. The second unidirectional conduction switch 40 is electrically connected with the second source electrode 32, or the second unidirectional conduction switch 40 is also electrically connected with the second drain electrode 33.

Figure 6:
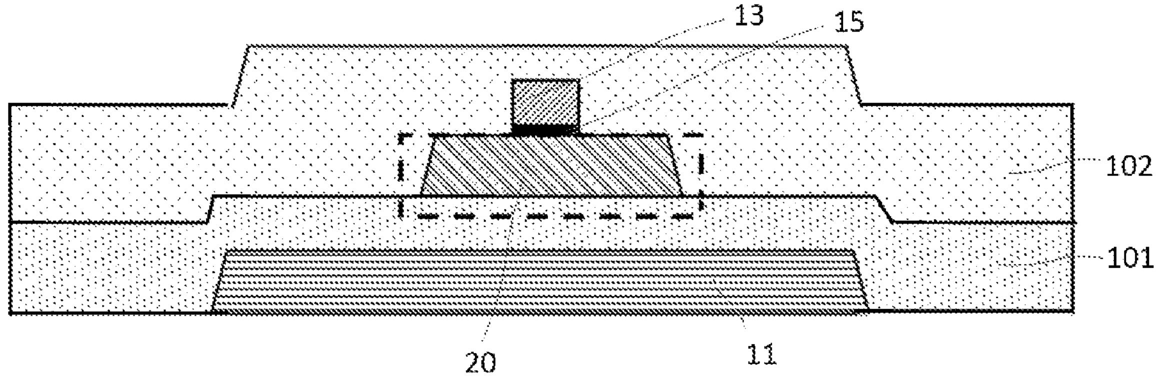
FIG. 6 is a sectional view along line B-B in the pixel drive circuit shown in FIG. 4.
Figure 7:
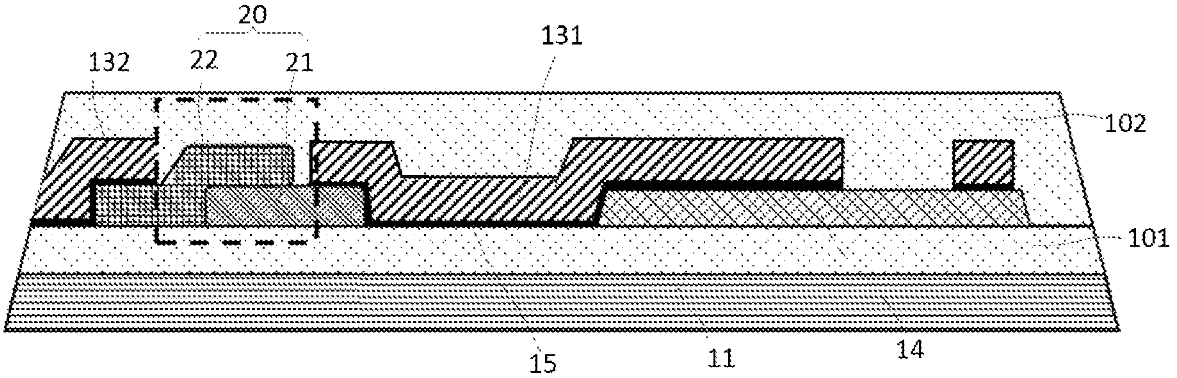
FIG. 7 is a sectional view along line C-C in the pixel drive circuit shown in FIG. 4.

The dotted line box in FIGS. 6 and 7 shows the position of the first unidirectional conduction switch 20. The overlapping position of the P-type amorphous silicon layer 21 and the N-type amorphous silicon layer 22 forms a PN junction. In an embodiment, the first drain electrode 13 includes a first drain part 131 and a second drain part 132 arranged at intervals, the first drain part 131 is overlapped with the active layer 14 of the first thin film transistor 10, and the second drain part 132 is connected with the pixel capacitor 50; the P-type amorphous silicon layer 21 is partially overlapped with the first drain part 131, one end of the N-type amorphous silicon layer 22 is overlapped with the P-type amorphous silicon layer 21, and the other end of the N-type amorphous silicon layer 22 is partially overlapped with the second drain part 132. The active layer 14 is an amorphous silicon layer.

The embodiment provides a specific arrangement method of the first unidirectional conduction switch 20 and TFT. By adopting the above technical solution, the first unidirectional conduction switch 20 electrically conducts the first drain part 131 and the second drain part 132, so that the first unidirectional conduction switch 20 can conduct or cut off the current in the first film transistor 10, which plays the role of a switch. When the first film transistor 10 is turned off, the first unidirectional conduction switch 20 can cut off the transmission of leakage current to the pixel capacitor 50, it is equivalent to adding a switch to the pixel drive circuit on the basis of TFT to effectively prevent leakage current.

In an embodiment, the first drain part 131 and the second drain part 132 are arranged at intervals and extended in a same direction. It can be understood that the specific structure of the first drain electrode 13 is not limited to this.

In the embodiment, the first source electrode 12 is U-shaped, and the first drain electrode 13 corresponds to the middle of the first source electrode 12; the present application does not limit the shape of the first thin film transistor 10, for example, the first thin film transistor 10 can also be I-shaped or other shapes.

In one embodiment, an N-type heavily doped layer 15 is arranged between the first unidirectional conduction switch 20 and the first drain electrode 13. The N-type heavily doped layer 15 can improve the contact between the first unidirectional conduction switch 20 and a metal. The N-type heavily doped layer 15 is further arranged above the active layer 14 of the first thin film transistor 10.

In an embodiment, the N-type amorphous silicon layer 22 is a phosphorus doped amorphous silicon film, which is obtained by amorphous silicon doped with phosphorus; the P-type amorphous silicon layer 21 is a boron doped amorphous silicon film, which is obtained by amorphous silicon doped with boron. The active layer 14 of the first thin film transistor 10 is an amorphous silicon layer, and the P-type amorphous silicon layer 21 and the N-type amorphous silicon layer 22 in the first unidirectional conduction switch 20 are the same layer with the active layer 14 and are arranged at intervals. During manufacturing, an amorphous silicon layer is made above the gate electrode, and then N type amorphous silicon layer 22 is obtained by amorphous silicon doped with phosphorus, and P type amorphous silicon layer 21 is obtained by amorphous silicon doped with boron; then, the N-type heavily doped layer 15 is obtained by heavily doping the part of the amorphous silicon layer corresponding to the source and drain electrodes.

Figure 5:
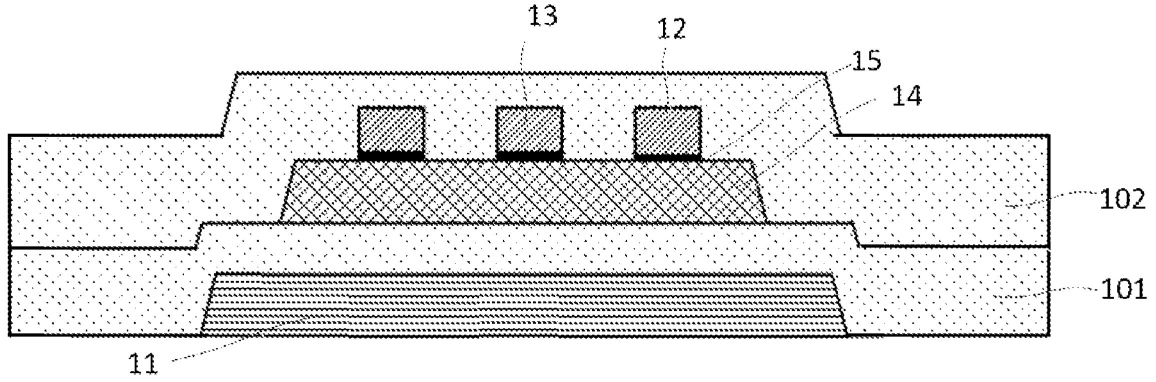
FIG. 5 is a sectional view along line A-A in the pixel drive circuit shown in FIG. 4.

FIGS. 5 to 7 illustrate the structure of the pixel drive circuit 100 in an embodiment, in which the array substrate is also provided with a gate insulation layer 101 covering the first gate electrode 11 and a protective layer 102 covering the first source electrode 12 and the first drain 13, which will not be repeated.

As shown in FIGS. 1 to 3. The first thin film transistor 10 is connected with the n-th scan line and the n-th data line to meet the charging needs of the pixel capacitor 50; the second thin film transistor 30 is connected with the (n−1)-th scan line and the grounded wire 70 to meet the need of the pixel capacitor 50 to discharge to ground.

The principle of the pixel drive circuit 100 is described below in conjunction with a timing chart.

The pixel drive circuit 100 is configured to drive a pixel to successively pass through a first voltage maintaining stage, a grounded discharge stage, a writing stage and a second voltage maintaining stage within a frame time.

When the pixel drive circuit 100 is in the first voltage maintaining stage (t1 and the time before t1), the pixel capacitor 50 maintains the voltage written in the previous frame; When the pixel drive circuit 100 is in the grounded discharge stage (t2), the pixel capacitor 50 discharges; When the pixel drive circuit 100 is in the writing stage (t3), the pixel capacitor 50 writes the voltage, and the potential of the previous frame is reset; When the pixel drive circuit 100 is in the second voltage maintaining stage (t4 and the time after t4), the pixel capacitor 50 maintains the voltage written in a current frame.

In an embodiment, during in t1, the n-th row pixel capacitor 50 maintains the pixel voltage of the previous frame; during in t2, Gate n−1 is turned on, and the n-th row pixel capacitor 50 is grounded and discharged; during in t3, Gate n−1 is turned off, Gate n is turned on, and the n-th row pixel capacitor 50 starts charging; during in t4, Gate n is turned off, and the n-th row pixel capacitor 50 maintains the pixel voltage of the current frame.

With the application of the above technical solution, during the first voltage maintaining stage, the potential of the pixel capacitor 50 is high, and the first unidirectional conduction switch 20 is in the off state, so as to avoid leakage current in the pixel; In the phase of ground discharge, the voltage value of pixel capacitor 50 is reduced to prepare for charging; during the writing stage, the first unidirectional conduction switch 20 is in the turn-on state, and the pixel capacitor 50 writes the voltage; during the second voltage maintaining stage, the potential of the pixel capacitor 50 is high, and the first unidirectional conduction switch 20 is in the turn-off state, which also avoids generating leakage current in the pixel. Therefore, the pixel drive circuit 100 provided in the present application can not affect the normal turn-on of TFT, but also improve the display screen crosstalk caused by leakage current by setting the first thin film transistor 10, the second transistor, the first unidirectional conduction switch 20 and the second unidirectional conduction switch 40.

When the (n−1)-th scan line receives the high potential signal, the pixel drive circuit 100 is in the grounded discharge stage, the second thin film transistor 30 is in the turn-on state, and the first thin film transistor 10 is in the turn-off state. In this way, when each scan line is turned on, a signal is input to the next scan line, that is, the change of the pixel potential of the next line is controlled by the change of the signal of the previous scan line, so that the next line of pixels is ready for charging.

It can be understood that the first thin film transistor 10 and the second thin film transistor 30 in each pixel drive circuit 100 will not be turned on at the same time to ensure that the pixel capacitor 50 can be charged and discharged normally.

The embodiment of the second aspect of the present application provides a display panel, which includes a plurality of scan lines which are mutually parallel and a plurality of data lines which are mutually parallel and arranged orthogonal to the scan lines; the plurality of scan lines and the plurality of data lines are vertically insulated and intersected to define a plurality of pixels; each of the plurality of pixels is correspondingly provided with a pixel drive circuit 100 provided in the first aspect.

In the above display panel, the pixel drive circuit 100 includes the first thin film transistor 10, the first unidirectional conduction switch 20, the second thin film transistor 30, the second unidirectional conduction switch 40, and the pixel capacitor 50. The pixel drive circuit 100 reduces the problem of power leakage in TFT caused by external energy excitation, thus effectively improving the poor display problems such as screen crosstalk, and ensuring the display effect of the display panel.

The above embodiments are only used to explain the technical solution of the present application, not to limit the present application; Although the present application has been described in detail with reference to the preceding embodiments, those skilled in the art should understand that they can still modify the technical solutions recorded in the preceding embodiments, or equivalent replace some of the technical features; However, these modifications or substitutions do not make the essence of the corresponding technical solutions separate from the spirit and scope of the technical solutions of the embodiments of the present application, and should be included in the scope of protection of the present application.

What is claimed is:

1. A pixel drive circuit, comprising: a first thin film transistor, a first unidirectional conduction switch connected in series with the first thin film transistor, a second thin film transistor, a second unidirectional conduction switch connected in series with the second thin film transistor, and a pixel capacitor arranged between the first unidirectional conduction switch and the second unidirectional conduction switch;

wherein the first thin film transistor comprises: a first gate electrode, a first source electrode, and a first drain electrode; the first gate electrode being connected with a n-th scan line, the first source electrode being connected with a m-th scan line, and the first drain electrode being connected with the pixel capacitor, and the n and m are positive integers; and the second thin film transistor comprises: a second gate electrode, a second source electrode, and a second drain electrode; the second gate electrode being connected with a (n−1)-th scan line, the second source electrode being connected with the pixel capacitor, and the second drain electrode being grounded.

2. The drive circuit according to claim 1, wherein the first unidirectional conduction switch comprises a P-type amorphous silicon layer and an N-type amorphous silicon layer arranged in overlapping.

3. The drive circuit according to claim 2, wherein the first unidirectional conduction switch is arranged above the first gate electrode, and the first unidirectional conduction switch is electrically connected with the first drain electrode.

4. The drive circuit according to claim 3, wherein the first drain electrode comprises: a first drain part and a second drain part arranged at intervals, the first drain part is overlapped with an active layer of the first thin film transistor, and the second drain part is connected with the pixel capacitor; the P-type amorphous silicon layer is partially overlapped with the first drain part, an end of the N-type amorphous silicon layer is overlapped on the P-type amorphous silicon layer, and the other end of the N-type amorphous silicon layer is partially overlapped with the second drain part.

5. The drive circuit according to claim 3, wherein an N-type heavily doped layer is arranged between the first unidirectional conduction switch and the first drain electrode.

6. The pixel drive circuit according to claim 1, wherein the pixel capacitor comprises a pixel electrode and a first common electrode; the pixel drive circuit further comprises a storage capacitor arranged between the first unidirectional conduction switch and the second unidirectional conduction switch, and the storage capacitor comprises the pixel electrode and a second common electrode.

7. The pixel drive circuit according to claim 1, wherein when the n-th scan line receives a high potential signal, the first thin film transistor is turned on and the first unidirectional conduction switch is in a turn-on state, and a voltage is written into the pixel capacitor; when the n-th scan line receives a low potential signal, the first thin film transistor is turned off and the first unidirectional conduction switch is in a turn-off state.

8. The pixel drive circuit according to claim 7, wherein the pixel drive circuit is configured to drive one pixel to successively pass through a first voltage maintaining stage, a grounded discharge stage, a writing stage and a second voltage maintaining stage within a frame time; when the pixel drive circuit is in the first voltage maintaining stage, the pixel capacitor maintains a voltage written in a previous frame; when the pixel drive circuit is in the grounded discharge stage, the pixel capacitor discharges; when the pixel drive circuit is in the writing stage, a voltage is written into the pixel capacitor; and when the pixel drive circuit is in the second voltage maintaining stage, the pixel capacitor maintains the voltage written in a current frame.

9. The pixel drive circuit according to claim 8, wherein when the (n−1)-th scan line receives a high potential signal, the pixel drive circuit is in the grounded discharge stage, the second thin film transistor is in a conducting state, and the first thin film transistor is in a turn-off state.

10. A display panel, comprising: a plurality of scan lines which are mutually parallel and a plurality of data lines which are mutually parallel and arranged orthogonal to the scan lines; the plurality of scan lines and the plurality of data lines are vertically insulated and intersected to define a plurality of pixels; each of the plurality of pixels is correspondingly provided with the pixel drive circuit, comprising: a first thin film transistor, a first unidirectional conduction switch connected in series with the first thin film transistor, a second thin film transistor, a second unidirectional conduction switch connected in series with the second thin film transistor, and a pixel capacitor arranged between the first unidirectional conduction switch and the second unidirectional conduction switch;

wherein the first thin film transistor comprises: a first gate electrode, a first source electrode, and a first drain electrode; the first gate electrode being connected with a n-th scan line, the first source electrode being connected with a m-th scan line, and the first drain electrode being connected with the pixel capacitor, and the n and m are positive integers; and the second thin film transistor comprises: a second gate electrode, a second source electrode, and a second drain electrode; the second gate electrode being connected with a (n−1)-th scan line, the second source electrode being connected with the pixel capacitor, and the second drain electrode being grounded.

11. The display panel according to claim 10, wherein the first unidirectional conduction switch comprises a P-type amorphous silicon layer and an N-type amorphous silicon layer arranged in overlapping.

12. The display panel according to claim 11, wherein the first unidirectional conduction switch is arranged above the first gate electrode, and the first unidirectional conduction switch is electrically connected with the first drain electrode.

13. The display panel according to claim 12, wherein the first drain electrode comprises: a first drain part and a second drain part arranged at intervals, the first drain part is overlapped with an active layer of the first thin film transistor, and the second drain part is connected with the pixel capacitor; the P-type amorphous silicon layer is partially overlapped with the first drain part, an end of the N-type amorphous silicon layer is overlapped on the P-type amorphous silicon layer, and the other end of the N-type amorphous silicon layer is partially overlapped with the second drain part.

14. The display panel according to claim 13, wherein an N-type heavily doped layer is arranged between the first unidirectional conduction switch and the first drain electrode.

15. The display panel according to claim 10, wherein the pixel capacitor comprises a pixel electrode and a first common electrode; the pixel drive circuit further comprises a storage capacitor arranged between the first unidirectional conduction switch and the second unidirectional conduction switch, and the storage capacitor comprises the pixel electrode and a second common electrode.

16. The display panel according to claim 10, wherein when the n-th scan line receives a high potential signal, the first thin film transistor is turned on and the first unidirectional conduction switch is in a turn-on state, and a voltage is written into the pixel capacitor; when the n-th scan line receives a low potential signal, the first thin film transistor is turned off and the first unidirectional conduction switch is in a turn-off state.

17. The display panel according to claim 16, wherein the pixel drive circuit is configured to drive one pixel to successively pass through a first voltage maintaining stage, a grounded discharge stage, a writing stage and a second voltage maintaining stage within a frame time; when the pixel drive circuit is in the first voltage maintaining stage, the pixel capacitor maintains a voltage written in a previous frame; when the pixel drive circuit is in the grounded discharge stage, the pixel capacitor discharges; when the pixel drive circuit is in the writing stage, a voltage is written into the pixel capacitor; and when the pixel drive circuit is in the second voltage maintaining stage, the pixel capacitor maintains the voltage written in a current frame.

18. The display panel according to claim 17, wherein when the (n−1)-th scan line receives a high potential signal, the pixel drive circuit is in the grounded discharge stage, the second thin film transistor is in a conducting state, and the first thin film transistor is in a turn-off state.

* * * * *